United States Patent [19]
Gentle et al.

[11] Patent Number: 5,468,826
[45] Date of Patent: Nov. 21, 1995

[54] ADHESION PROMOTING ADDITIVES AND CURABLE ORGANOSILOXANE COMPOSITIONS CONTAINING SAME

[75] Inventors: Theresa E. Gentle; Michael A. Lutz, both of Midland, Mich.

[73] Assignee: Dow Corning Corporation, Midland, Mich.

[21] Appl. No.: 240,426

[22] Filed: May 10, 1994

[51] Int. Cl.$^6$ .................................................. C08G 77/08
[52] U.S. Cl. ............................. 528/15; 528/18; 528/21; 528/35; 528/39; 522/99; 525/477; 525/478
[58] Field of Search ............................. 528/15, 18, 21, 528/35, 39; 522/99; 525/477, 478

[56] References Cited

U.S. PATENT DOCUMENTS

| | | | |
|---|---|---|---|
| 3,772,026 | 11/1973 | Greenwald | 96/77 |
| 3,873,334 | 3/1975 | Lee et al. | 106/287 |
| 4,077,943 | 3/1978 | Sato et al. | 260/46.5 |
| 4,082,726 | 4/1978 | Mine et al. | 260/46.5 |
| 4,087,585 | 5/1978 | Schulz | 428/429 |
| 4,196,273 | 4/1980 | Imai et al. | 528/15 |
| 4,329,273 | 5/1982 | Hardman et al. | 524/862 |
| 4,659,851 | 4/1987 | Plueddemann | 556/431 |
| 4,677,161 | 6/1987 | Suzuki et al. | 524/862 |
| 4,719,262 | 1/1988 | Plueddemann | 525/105 |
| 4,732,932 | 3/1988 | Waldern | 524/862 |
| 4,786,701 | 11/1988 | Tanaka | 528/15 |
| 4,906,686 | 3/1990 | Suzuki et al. | 524/730 |
| 5,106,933 | 4/1992 | Kobayashi et al. | 528/15 |
| 5,248,751 | 9/1993 | Takahashi et al. | 528/15 |
| 5,344,905 | 9/1994 | Morita | 528/39 |

FOREIGN PATENT DOCUMENTS

| | | |
|---|---|---|
| 1085224 | 3/1989 | Japan . |
| 2018452 | 1/1990 | Japan . |
| 4311766 | 11/1992 | Japan . |

*Primary Examiner*—Melvyn I. Marquis
*Attorney, Agent, or Firm*—Robert Spector

[57] ABSTRACT

The present invention provides organosiloxane copolymers comprising $SiO_{4/2}$ units, silicon-bonded hydrolyzable groups, epoxy or acryloxyalkyl groups and silicon-bonded hydrogen atoms. The copolymers are particularly useful as adhesion promoting additives in organosiloxane compositions that cure by a platinum group metal-catalyzed hydrosilation reaction at temperatures up to 100° C.

14 Claims, No Drawings

ADHESION PROMOTING ADDITIVES AND CURABLE ORGANOSILOXANE COMPOSITIONS CONTAINING SAME

BACKGROUND OF THE INVENTION

1. Field of the Invention

This invention relates to new multifunctional organosilicon copolymers and their use as adhesion additives in curable organosiloxane compositions. Preferred compositions cure by a platinum group metal catalyzed hydrosilation reaction at temperatures of up to 100° C.

2. Background Information

The curing characteristics of organosiloxane compositions and the properties of the cured materials obtained from these compositions are desirable for a variety of end use applications, particularly in the electrical and electronics areas. The cured materials are useful as protective coatings, potting materials and encapsulants for integrated circuits and other electronic devices and as coatings for printed circuit boards.

A shortcoming of organosiloxane compositions, particularly those that cure by a platinum group metal catalyzed hydrosilation reaction, is their inability to develop strong adhesion to many substrates, particularly plastics and certain metals. One method for remedying this deficiency is by using primer compositions or adhesion promoting additives containing one or more silanes and/or organosiloxanes with a plurality of silicon-bonded hydrolyzable groups and at least one organofunctional substituent that is bonded to silicon through at least one carbon atom.

Primer compositions are applied to substrates to which adhesion is desired prior to application of the curable organosiloxane composition. Adhesion promoters may also be present in the curable organosiloxane composition.

Adhesion promoting additives described in the prior art typically contain at least two functional groups.

U.S. Pat. Nos. 3,772,026 and 3,873,334 teach acyloxy functional silanes which additionally have silicon hydride or alkenyl functionality respectively. Although the acyloxy functionality is very reactive, it liberates corrosive acetic acid upon reaction with hydroxyl groups present at the surface of the substrate or with ambient moisture.

U.S. Pat. No. 4,196,273 teaches use of unsaturated alkoxysilanes, such as vinyltrimethoxysilane, as adhesion additives. Adhesion is not demonstrated at temperatures below 100° C. and only adhesion to glass is demonstrated at 100° C. U.S. Pat. No. 4,329,273 teaches use of partially hydrolyzed unsaturated alkoxysilanes. Curing of compositions containing these adhesion promoting additives did not occur at ambient laboratory temperatures, but cure at 100° C. was demonstrated.

U.S. Pat. No. 4,082,726 teaches organosilicon compounds containing epoxy functional dialkoxysilyl groups and at least one alkenyl radical or hydrogen atom bonded to silicon in the organosilicon compound. Adhesion with compositions containing these compounds is demonstrated after cure at between 100°–200° C. U.S. Pat. No. 4,087,585 teaches physical blends of epoxy functional alkoxysilanes with silanol functional fluids containing alkenyl functionality. Cure was obtained at elevated temperatures. Multifunctional organosilanes containing ethylenic unsaturation, epoxy functionality, and alkoxy functionality are taught in U.S. Pat. No. 4,732,932. U.S. Pat. No. 5,106,933 teaches use of mixtures of alkoxysilanes.

U.S. Pat. Nos. 4,659,851, 4,719,262, and 4,906,686 teach reaction products of unsaturated alcohols with alkoxysilanes as adhesion promoting additives. The resultant Si-O-C bond between the unsaturated alcohol and alkoxysilane would be susceptible to hydrolysis such that the adhesion could be decreased upon exposure to moisture.

U.S. Pat. No. 4,077,943 teaches using an organohydrogensiloxane containing epoxy functionality as the curing agent for organosiloxane compositions. Japanese Laid Open Patent Application (JLOPA) 1/085,224 teaches accelerating the development of adhesion using organosiloxanes containing epoxy functional silsesquioxane units and optional ethylenic unsaturation, but no $Si(OR)_3$ functional groups. JLOPA 4/311,766 teaches adhesion promoting additives containing a) siloxane units with at least one alkoxysilylalkyl group, b) siloxane units with at least one terminally unsaturated alkenyl radical; c) trialkoxysiloxy units and d) $SiO_{4/2}$ units. JLOPA 2/18452 describes adhesion promoters that include organosilicon compounds containing two silicon-bonded alkoxy groups and at least one epoxy group and organosilicon compounds containing at least one alkoxy group and at least two ethylenically unsaturated double bonds per molecule.

U.S. Pat. No 4,786,701 teaches adhesion promoters which are hydrolysis reaction products of tetraalkoxysilanes, alkenyl or silicon hydride functional organopolysiloxane, and optional (meth)acryloxy functional alkoxysilanes. U.S. Pat. No. 4,677,161 teaches silicon hydride functional $SiO_2$ resins containing residual alkoxy groups, however no $Si(OR)_3$ groups are present.

None of the aforementioned patents demonstrate that adhesion can be achieved at temperatures below 100° C. or to a variety of substrates.

One objective of this invention is to define a group of organosilicon compounds that impart adhesion between a) elastomers and other products prepared by curing organosiloxane compositions and b) a variety of organic and inorganic substrates that the compositions are in contact with during curing. Preferred additives impart adhesion at curing temperatures of up to 100° C.

SUMMARY OF THE INVENTION

The objectives of the present invention can be achieved by the presence in the curable organosiloxane composition of a specified group of organosiloxane copolymers comprising $SiO_{4/2}$ units, silicon-bonded hydrolyzable groups, epoxy or (meth)acryloxyalkyl groups and either silicon-bonded hydrogen atoms or alkenyl radicals.

DETAILED DESCRIPTION OF THE INVENTION

This invention provides an improved curable organosiloxane composition, said composition comprising (A) a curable polyorganosiloxane;

(B) a curing agent in an amount sufficient to cure said composition; and (C) a curing catalyst in an amount sufficient to promote curing of said composition;

where said composition cures using a reaction selected from the group consisting of hydrosilation reactions catalyzed by platinum group metals and compounds thereof, reactions of silicon-bonded hydrogen atoms with silanol groups, and free radical reactions initiated by the decomposition of a photolytically unstable compound.

The improvement comprises the presence in the curable composition of (D) an amount sufficient to achieve adhesion to substrates in contact with said composition during curing thereof of an adhesion promoting additive comprising at least one organosiloxane copolymer corresponding to the general formula

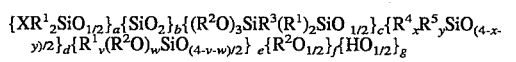

wherein each $R^1$ is individually selected from monovalent hydrocarbon radicals that are substantially free of ethylenic unsaturation and contain from 1 to 10 carbon atoms, $R^2$ is an alkyl radical containing 1 to 10 carbon atoms, $R^3$ is a divalent hydrocarbon radical containing from 2 to 10 carbon atoms, each $R^4$ is individually selected from the group consisting of monovalent hydrocarbon radicals containing an epoxy, acryloxyalkyl or methacryloxyalkyl group, $R^5$ is $R^1$ $OR^2$; X is hydrogen or an alkenyl radical, a, b, c, d, e, f and g represent mole fractions with a total value of 1, a, b, c, and d are all greater than zero, e, f and g are 0 or a positive number less than 1; x is 1, 2, or 3; y is 0, 1, or 2; x+y is 1, 2 or 3; v and w are each 0, 1, 2, or 3; and v+w is 1, 2 or 3.

The adhesion promoting additives of the present compositions are novel compounds and constitute one embodiment of the present invention.

As used in this specification the term "cure" means the conversion of a liquid or semi-solid composition to a crosslinked elastomeric or resinous material by the reaction of groups present on the polyorganosiloxane referred to as ingredient A of the present compositions with the curing agent.

The adhesion promoting additives can be used with organosiloxane compositions that cure by a variety of reactions.

One type of composition cures by a hydrosilation reaction catalyzed by metals from the platinum group of the periodic table and compounds of these metals.

Other curing reactions involve
1) the reaction of silanol groups on a polyorganosiloxane with silicon-bonded hydrogen atoms on the curing agent in the presence of the same catalysts used for hydrosilation reactions, tin compounds or amines, particularly hydroxylamines;
2) the generation of free radicals on the polyorganosiloxane initiated by the photoinduced decomposition in the presence of ultraviolet radiation of photosensitive compounds such as alpha-hydroxy ketones.

The Adhesion Promoting Additive (Ingredient D)

The characterizing feature of the present organosiloxane compositions is the adhesion-promoting additive, referred to hereinafter as ingredient D. This ingredient can be defined as an organosiloxane copolymer containing a combination of repeating units that distinguish it from prior art organosiloxane copolymers.

The required units that constitute the ingredient D are diorganohydrogensiloxy or diorganoalkenylsiloxy $(XR^1{}_2SiO_{1/2})$ (I), trialkoxysilylalkyldiorganosiloxy $[(R^2O)_3SiR^3Si(R^1)_2O_{1/2}]$ (II), siloxane units containing a silicon-bonded epoxyalkyl, acryloxyalkyl or methacryloxyalkyl group, represented by $R^4$ in the formula $R^4{}_xR^5{}_ySiO_{4-x-y}$ (III), and $SiO_{4/2}$ units (IV). X represents hydrogen or an alkenyl radical. Alkenyl radicals represented by X preferably contain from 2 to 12 carbon atoms and are terminally unsaturated. X is most preferably hydrogen, vinyl or 5-hexenyl.

The optional units that can be present in this copolymer are siloxane units containing 1) at least one silicon-bonded hydrocarbon radical and/or alkoxy group or 2) a silicon-bonded hydroxyl group.

The monovalent hydrocarbon radicals represented by $R^1$ contain from 1 to 10 carbon atoms, can contain substituents such as halogen atoms, and are substantially free of ethylenic unsaturation. These hydrocarbon radicals include but are not limited to alkyl such as methyl, ethyl, n-propyl, n-butyl and n-decyl; haloalkyl such as chloromethyl and 3,3,3-trifluoropropyl; cycloalkyl such as cyclohexyl; aryl such as phenyl and naphthyl; alkaryl such as tolyl and xylyl; and aralkyl such as benzyl. When more than 1 $R^1$ is present on a silicon atom, these can be identical or different. $R^1$ is preferably selected from methyl, ethyl, 3,3,3-trifluoropropyl and phenyl, this preference being based on the availability and cost of the starting materials, typically the corresponding chlorosilanes, used to prepare the copolymer.

$OR^2$ represents an alkoxy group containing from 1 to 10 carbon atoms, and is preferably methoxy or ethoxy, this preference being based on the low boiling points of the alcohols formed upon hydrolysis of this alkoxy group during curing of organosiloxane compositions containing the present adhesion promoters and their reactivity, which promotes adhesion.

$R^3$ represents a divalent hydrocarbon radical containing from 2 to 10 carbon atoms, and includes but is not limited to alkylene such as ethylene and propylene, cycloalkylene such as cyclohexylene, and arylene such as phenylene. $R^3$ is preferably ethylene based on the availability of the intermediates used to prepare this unit of the present copolymers.

$R^4$ represents a monovalent radical containing an epoxy, acryloxyalkyl or methacryloxyalkyl group that is bonded to silicon through at least one carbon atom that is not part of the functional group. Preferred embodiments of $R^4$ include 3-glycidoxypropyl, 3-epoxycyclohexylmethyl and 3-methacryloxypropyl. In preferred $R^4{}_xR^5{}_ySiO_{4-x-y}$ units, $R^5$ is methoxy or ethoxy, x is 1, and y is 2. These preferences are based on the availability of the intermediates for preparing these units of the present copolymers and the high level adhesion imparted by the copolymers to curable organosiloxane compositions.

In the present copolymers the $XR^1{}_2SiO_{1/2}$ or I units constitute from 5 to 50 percent, preferably from 25 to 40 percent of the total units the $(R^2O)_3SiR^3Si(R^1)_2O_{1/2}$ or II units constitute from 3 to 30 percent, preferably from 10 to 20 percent of the total units, the units containing silicon-bonded epoxyalkyl or (meth)acryloxyalkyl groups, or III units, constitute from 3 to 30 percent, preferably from 10 to 20 percent, of the total units and the $SiO_{4/2}$ units (IV units) from 10 to 50 percent, preferably from 35 to 45 percent, of the total units.

The total of all the aforementioned optional units typically constitute from 0 to 30 percent of the total units present in the copolymer.

The organosiloxane copolymers referred to in this specification as ingredient D can be prepared by cohydrolysis of a mixture of at least four silanes. Each one of the silanes is a precursor for one of the four types of required repeating units and any of the silicon-containing optional unit present in the final adhesion additive.

For example, the precursor of unit I can be a diorganohydrogensilane containing silicon-bonded halogen or alkoxy as the hydrolyzable group; unit II can be derived from a tetrachlorosilane or an alkylorthosilicate; and unit IV from a silane containing at least one silicon-bonded epoxyalkyl or (meth)acryloxyalkyl radical and at least one silicon-bonded hydrolyzable group. The precursor of unit III, a silane containing an alkenyl radical such as vinyl and three hydrolyzable groups, is reacted with the product of the cohydrolysis reaction.

Methods for hydrolyzing mixtures of silanes in the presence of controlled amounts of water to form organosiloxane copolymers are sufficiently described in the literature that a detailed description in this specification is not required.

A preferred method for preparing the organosiloxane copolymers used as ingredient D of the present curable compositions utilizes the reaction of known organosiloxane copolymers containing diorganohydrogensiloxy ($HR^1{}_2SiO_{1/2}$) and $SiO_{4/2}$ units with a mixture of an alkenyltrialkoxysilane and an ethylenically unsaturated organic epoxide such as allylglycidyl ether. Copolymers of this type are described in U.S. Pat. No. 4,707,531.

Preferred intermediate copolymers have the general structure $\{HMe_2SiO_{1/2}\}_{1.82}\{SiO_2\}_{1.00}$.

The reaction is typically conducted in the presence of a hydrosilation catalyst such as a metal from the platinum group of the periodic table or a compound of one of these metals. The combined concentrations of alkenyltrialkoxysilane and organic epoxide compound is typically sufficient to react with from 10 to 80 percent of the silicon-bonded hydrogen atoms present in the intermediate copolymer. In preferred copolymers the alkenyltrialkoxysilane constitutes from 30 to 60 percent of this total.

It may be desirable to include in the reaction mixture for preparing ingredient D a liquid diluent that may also function as a solvent for the reactants. Suitable diluents include aliphatic and aromatic hydrocarbons that are liquid at ambient temperature and boil within the range of from 50° to about 150° C. Representative diluents include hexane, heptane and liquid aromatic hydrocarbons such as toluene and xylene.

In preferred compositions the concentration of ingredient D is typically from 1 to 10, preferably from 2 to 5 weight percent, based on the total weight of the curable composition.

The present adhesion promoting additives are particularly useful in organosiloxane compositions that cure by a platinum group metal-catalyzed hydrosilation reaction at temperatures below about 100° C. The additives are also useful in organosiloxane compositions that cure in the presence of free radicals generated by the photoinduced decomposition of a one of the known types of photoinitiators.

The adhesion to certain substrates such as glass and aluminum, achieved using the present adhesion additives, particularly those containing silicon-bonded trialkoxysilylethyl groups, can be improved by combining the adhesion additive with from 1 to 5 percent, based on the weight of the curable organosiloxane composition, of a silane containing at least three alkoxy groups. Preferred silanes are alkenyltrialkoxysilanes, where the alkenyl radical contains from 2 to 10 carbon atoms, and alkyl orthosilicates. Allyltrimethoxysilane and ethyl orthosilicate are particularly preferred for use in combination with the present adhesion additives.

The ingredients of preferred curable organosiloxane compositions will now be discussed in detail.

The Polyorganosiloxane (Ingredient A)

The polyorganosiloxane ingredient, referred to hereinafter as ingredient A, of preferred curable organosiloxane compositions of this invention is the principal ingredient of these compositions. Because these compositions cure by a hydrosilation reaction, ingredient A contains at least two silicon-bonded alkenyl radicals in each molecule.

Suitable alkenyl radicals contain from 1 to about 10 carbon atoms and are exemplified by but not limited to vinyl, allyl and 5-hexenyl. The silicon-bonded organic groups other than alkenyl radicals present in ingredient A are typically monovalent hydrocarbon and halogenated monovalent hydrocarbon radicals exemplified by but not limited to alkyl radicals such as methyl, ethyl and propyl; aryl radicals such as phenyl; and halogenated alkyl radicals such as 3,3,3-trifluoropropyl.

The molecular structure of ingredient A is not critical to the present invention, and will be determined by the physical properties desired in the cured composition. To achieve a useful level of tensile properties in the elastomers and other products prepared by curing the present compositions, the molecular weight of this ingredient should be sufficient to achieve a viscosity at 25° C. greater than about 0.1 Pa.s.

The upper limit for the molecular weight of ingredient A is not specifically restricted, and is typically limited only by the processability of the curable organosiloxane composition. The polyorganosiloxanes range from pourable liquids to gum type polymers that are typically characterized by Williams plasticity values.

Preferred embodiments of ingredient A are polydiorganosiloxanes represented by the general formula I

where each $R^7$ is individually selected from monovalent hydrocarbon radicals and alkenyl radicals, $R^8$ represents a vinyl or other alkenyl radical, and n represents a degree of polymerization equivalent to a viscosity of at least 100 centipoise (0.1 Pa.s), preferably from 0.1 to 10 Pa.s.

The hydrocarbon radicals represented by $R^7$ are either unsubstituted or can contain substituents such as halogen atoms that will not adversely affect the storage stability and curing of the present compositions or the properties of cured articles prepared from these compositions.

The two $R^7$ substituents on each of the silicon atoms in formula I can be identical or different, and can contain from 1 to about 20 carbon atoms. A range of from 1 to 10 carbon atoms is preferred based on the availability of the corresponding monomers. Most preferably at least one of the hydrocarbon radicals on each silicon atom is methyl, and any remainder are vinyl, phenyl and/or 3,3,3-trifluoropropyl, this preference being based on the availability of the reactants typically used to prepare the polydiorganosiloxane and the properties of cured elastomers prepared from these polydiorganosiloxanes. For the same reasons, $R^8$ is preferably vinyl or 5-hexenyl Representative embodiments of ingredient A containing ethylenically unsaturated hydrocarbon radicals only at the terminal positions include but are not limited to dimethylvinylsiloxy-terminated polydimethylsiloxanes, dimethylvinylsiloxy-terminated polymethyl-3,3,3-trifluoropropylsiloxanes, dimethylvinylsiloxy-terminated-dimethylsiloxane/3,3,3-trifluoropropylmethylsiloxane copolymers and dimethylvinylsiloxy-terminated-dimethylsiloxane/methylphenylsiloxane copolymers.

Methods for preparing ingredient A of the present compositions by hydrolysis and condensation of the corresponding halosilanes or by condensation of the cyclic polydiorganosiloxanes are sufficiently disclosed in the patent and other literature that a detailed description in this specification is not necessary.

For applications requiring high levels of physical properties such as tear strength it may be desirable to include in the curable organosiloxane composition a second polydiorganosiloxane containing ethylenically unsaturated hydrocarbon radicals bonded to both terminal and non-terminal silicon atoms.

The Organohydrogensiloxane Curing Agent (Ingredient B).

The preferred curable organosiloxane compositions of this invention contain at least one organohydrogensiloxane that functions as a curing agent for ingredient A. In the presence of the hydrosilation catalyst, referred to as ingredient C, the silicon-bonded hydrogen atoms in ingredient B undergo an addition reaction, referred to as hydrosilation, with the silicon-bonded alkenyl groups in ingredient A, resulting in crosslinking and curing of the composition.

Ingredient B must contain at least 2 silicon-bonded hydrogen atoms in each molecule. If ingredient A contains only two alkenyl radicals per molecule, ingredient B must contain an average of more than two silicon-bonded hydrogen atoms to achieve a crosslinked structure in the final cured product.

The silicon-bonded organic groups present in ingredient B are selected from the same group of monovalent hydrocarbon and halogenated hydrocarbon radicals as the organic groups of ingredient A, with the proviso that the organic groups in ingredient B must be substantially free of ethylenic or acetylenic unsaturation. The molecular structure of ingredient B can be straight chain, branch-containing straight chain, cyclic, or network.

While the molecular weight of ingredient B is not specifically restricted, viscosities in the range of 3 to 10,000 centipoise (0.003 to 10 Pa.s) at 25 degrees Centigrade are preferred.

The concentration of ingredient B is sufficient to provide a molar ratio of silicon-bonded hydrogen atoms to alkenyl radicals in the curable composition of from 0.5 to 20. A range of from 0.5 to 2 is preferred.

When the curable composition contains less than 0.5 moles of silicon-bonded hydrogen atoms per mole of alkenyl radicals it may not be possible to achieve the desired physical properties following curing. The physical properties of the cured article may vary with time when this ratio exceeds about 20 moles of silicon-bonded hydrogen per mole of alkenyl radicals.

The Hydrosilation Reaction Catalyst (Ingredient C)

Curing of the present compositions is catalyzed by a hydrosilation catalyst that is a metal from the platinum group of the periodic table or a compound of such a metal. These metals include platinum, palladium and rhodium. Platinum and platinum compounds are preferred based on the high activity level of these catalysts in hydrosilation reactions.

Examples of preferred curing catalysts include but are not limited to platinum black, platinum metal on various solid supports, chloroplatinic acid, alcohol solutions of chloroplatinic acid, and complexes of chloroplatinic acid with liquid ethylenically unsaturated compounds such as olefins and organosiloxanes containing ethylenically unsaturated hydrocarbon radicals bonded to silicon. Complexes of chloroplatinic acid with the aforementioned organosiloxanes containing ethylenically unsaturated hydrocarbon radicals are described in U.S. Pat. No. 3,419,593, which issued to David N. Willing on Dec. 31, 1968. The relevant portions of this patent are incorporated herein by reference as a teaching of preferred catalysts.

The concentration of ingredient C in the present compositions is equivalent to a platinum concentration of from 0.1 to 500 parts by weight of platinum metal, preferably from 1 to 50 parts by weight of platinum metal, per million parts (ppm), based on the combined weight of ingredients A and B.

Curing does not proceed satisfactorily at below 0.1 ppm of platinum, while using more than 500 ppm results in no appreciable increase in cure rate, and is therefore uneconomical.

Platinum Catalyst Inhibitors

Mixtures of the aforementioned ingredients A, B and C may begin to cure at ambient temperature. To obtain a longer working time or "pot life", the activity of the catalyst under ambient conditions can be retarded or suppressed by addition of a suitable inhibitor.

Known platinum catalyst inhibitors include the acetylenic compounds disclosed in U.S. Pat. No. 3,445,420, which issued on May 20, 1969 to Kookootsedes et al. Acetylenic alcohols such as 2-methyl-3-butyn-2-ol constitute a preferred class of inhibitors that will suppress the activity of a platinum-containing catalyst at 25° C. Compositions containing these catalyst inhibitors typically require heating at temperatures of 70° C. or above to cure at a practical rate.

When it is desired to increase the pot life of a curable composition under ambient conditions, this can be accomplished using an alkenyl substituted siloxane of the type described in U.S. Pat. No. 3,989,667, which issued on Nov. 2, 1976 to Lee and Marko. Cyclic methylvinylsiloxanes are preferred.

Inhibitor concentrations as low as one mole of inhibitor per mole of platinum will in some instances impart satisfactory storage stability and cure rate. In other instances inhibitor concentrations of up to 500 or more moles of inhibitor per mole of platinum are required. The optimum concentration for a given inhibitor in a given composition can readily be determined by routine experimentation and does not constitute part of this invention.

Optional Ingredients

Reinforcing Fillers

To achieve high levels of tear strength and other physical properties that characterize some types of cured elastomers that can be prepared using the compositions of this invention, it may be desirable to include a reinforcing filler such as finely divided silica. Silica and other reinforcing fillers are often treated with one of more of the known filler treating agents to prevent a phenomenon referred to as "creping" or "crepe hardening" during processing of the curable composition.

Finely divided forms of silica are preferred reinforcing fillers. Fumed silicas are particularly preferred because of their relatively high surface area, which is typically at least 50 square meters per gram. Fillers having surface areas of at least 200 square meters per gram are preferred for use in the present method.

The amount of finely divided silica or other reinforcing filler used in the present compositions is at least in part determined by the physical properties desired in the cured elastomer. Liquid or pumpable polyorganosiloxane compositions typically contain from about 10 to about 60 percent by weight of silica, based on the weight of polydiorganosiloxane. This value is preferably from about 30 to about 50 percent.

The filler treating agent can be any of the low molecular weight organosilicon compounds disclosed in the art as being suitable for preventing creping of organosiloxane compositions during processing. The treating agents are typically liquid hydroxyl terminated polydiorganosiloxanes containing an average of from 2 to about 20 repeating units per molecule, and organosilicon compounds such as hexaorganodisiloxanes and hexaorganodisilazanes that hydrolyze and condense under the conditions used to treat the filler. Preferably at least a portion of the silicon bonded hydrocarbon radicals present on the treating agent are identical to a majority of the hydrocarbon radicals present in ingredients A and B. A small amount of water can be added together with the silica treating agent(s) as a processing aid.

It is believed that the treating agents function by reacting with silicon-bonded hydroxyl groups present on the surface of the silica or other filler particles to reduce interaction between these particles and the polyorganosiloxanes present in the curable composition.

When a silica filler is used, it is preferably treated in the presence of at least a portion of the other ingredients of the present compositions by blending these ingredients together until the filler is completely treated and uniformly dispersed to form a homogeneous material.

The ingredients that are present during treatment of the filler typically include the silica treating agents and at least a portion of the polydiorganosiloxane(s) referred to herein as ingredient A.

Additional Optional Ingredients

The present organosiloxane compositions can contain one or more additives that are conventionally present in curable compositions of this type to impart or enhance certain physical properties of the cured composition in addition to adhesion or to facilitate processing of the curable composition.

Typical additives include but are not limited to non-reinforcing fillers such as quartz, alumina, mica and calcium. carbonate; pigments such as carbon black and titanium dioxide; dyes, flame retardants, and heat and/or ultraviolet light stabilizers. Resinous organosiloxane copolymers can be used in place of or in combination with one or more reinforcing fillers to improve the physical properties of the cured organosiloxane composition.

A preferred type of resinous copolymer contains repeating units of the general formula $SiO_{4/2}$ in addition to triorganosiloxy units of the general formulae $R^9_3SiO_{1/2}$ and diorganovinylsiloxy units of the general formula $CH_2=CH(R^{10})_2SiO_{1/2}$. In these formulae $R^9$ and $R^{10}$ are individually monovalent hydrocarbon or substituted monovalent hydrocarbon radicals as previously defined for the $R^7$ radicals of ingredient A.

The molar ratio of the combination of triorganosiloxy units and diorganovinylsiloxy units to $SiO_{4/2}$ units in the resinous copolymer is from 0.7 to 1.2, inclusive. The vinyl-containing units constitute from 2 to 8 percent by weight of the copolymer, which preferably contains at least two vinyl radicals per molecule. In preferred embodiments of the copolymer the ranges for the molar ratio of diorganovinylsiloxy: triorganosiloxy:$SiO_{4/2}$ units is 0.08–0.1:0.06–1:1.

The resinous copolymers can be prepared as described in U.S. Pat. No. 2,676,182, which issued to Daudt and Tyler on Apr. 20, 1954 and is hereby incorporated in this specification by reference thereto. The copolymers described in this patent contain from 2 to 23 percent by weight of hydroxyl groups, which is considerably above the maximum level of about 0.8 weight percent preferred for precursors of the present copolymers. The hydroxyl content of the precursor can be conveniently reduced to the desired level by employing a higher concentration of triorganosiloxy units than the concentration range taught by Daudt et al.

Preparation of Curable Compositions

The compositions of this invention can be prepared by combining all of ingredients at ambient temperature. Any of the mixing techniques and devices described in the prior art can be used for this purpose. The particular device used will be determined by the viscosity of the ingredients and the final curable composition. Suitable mixers include but are not limited to paddle type mixers, kneader type mixers and two- and three-roll rubber mills.

Cooling of the ingredients during mixing may be desirable to avoid premature curing of the composition.

To maximize storage stability the curable compositions are preferably kept in closed containers until used. If greater storage stability is desired, the preferred compositions can be packaged in two or more containers with the organohydrogensiloxane (ingredient B) and the platinum group metal catalyst (ingredient C) in separate containers.

Depending upon the types and concentrations of polyorganosiloxane and curing agent, cured organosiloxane materials prepared using the present compositions can vary in properties from brittle resins to elastomers to gels, and are useful in a variety of end-use applications as coatings or as molded or extruded articles. Unfilled materials are particularly useful as adhesives, protective coatings, encapsulants and potting compositions for protecting delicate electronic devices such as transistors and integrated circuits from damage by moisture and other materials present in the environment that can adversely affect operation of the device. The compositions can be used to coat either the individual devices or a circuit board containing a number of these devices together with other electronic components.

The present compositions can be applied to substrates by spraying, dipping, pouring, extrusion or by the use of a brush, roller or coating bar. The selection of a particular application method will be determined at least in part by the viscosity of the curable composition. The viscosity of the composition can be reduced using suitable solvents or reactive diluents as known in the art.

Curing of the preferred compositions commences when ingredients A, B and C are combined. One advantage of the present adhesion promoting compositions is the absence of substantial retardation of the hydrosilation reaction used to cure these preferred compositions.

Organosiloxane compositions containing the present adhesion additives cohesively bond to a variety of organic and inorganic substrates during curing at temperatures as low as 25° C. The ability of the present compositions to develop adhesion when cured at these relatively low temperatures make them suitable for application to substrates that cannot withstand the elevated temperatures of 100° C. or higher required to cure organosiloxane compositions containing some prior art adhesion additives that inhibit platinum group metal catalysts.

Preferred compositions cure over a period of several hours under ambient conditions. As is true for other compositions that cure by a platinum-catalyzed hydrosilation reaction, curing can be accelerated by heating. Curing temperatures of from 25° to about 80° C. are preferred.

Unlike many prior art adhesion promoters, the initial adhesion imparted by preferred adhesion additives is not adversely affected to any substantial extent when substrates coated using the present compositions are exposed to moisture. This is particularly desirable when the compositions are used to coat and seal electronic devices such as semiconductor devices and integrated circuits whose performance can be adversely affected by moisture and other contaminants to which these devices can be exposed to during use.

EXAMPLES

The following examples describe preferred curable compositions of the present invention and should not be interpreted as limiting the scope of the invention defined in the accompanying claims. Unless otherwise specified all parts and percentages in the example are by weight and viscosities were measured at 25° C.

The following general procedure was used for preparation of the present organosiloxane copolymers:

The dimethylhydrogensiloxy/$SiO_{4/2}$ copolymer used as the starting material for preparing the copolymers contained 60 mole percent of dimethylhydrogensiloxy units. This copolymer was prepared as described in U.S. Pat. No. 4,707,531 and was dried over molecular sieves.

Vinyltrimethoxysilane was used as received.

Hexenyltrimethoxysilane was freshly distilled from sodium methoxide.

Toluene was reagent grade and freshly distilled from calcium hydride.

The platinum catalyst was a reaction product of platinic chloride and sym-tetramethyldivinyldisiloxane that had been diluted with toluene to achieve a platinum content of 0.99 weight percent.

Other chemicals were purchased from commercial suppliers and used as received.

The required amount of copolymer was weighed into a 250 ml-capacity glass reactor, followed by 50 g toluene. The reactor was then equipped with a magnetic stirrer, thermometer, temperature controller, addition funnel, water cooled condenser, and a gas inlet tube. All the glassware had been dried at 120° C. prior to use.

The ethylenically unsaturated reactants were then weighed into the additional funnel and diluted to 50 ml total volume with toluene. A mixture of 4% oxygen in nitrogen was introduced into the reactor through the gas inlet tube while the reactants were weighed into the addition funnel. Following this operation the same gas mixture was introduced through a syringe needle that extended below the surface of the liquid in the reactor and the platinum catalyst was added. The reaction mixture was then heated. When the temperature of the reaction mixture reached 100° C. the unsaturated compounds were added over 1–2 hours. Samples were periodically withdrawn from the reaction mixture and monitored to determine the extent of reaction using gas/liquid chromatography (GC). Heating was continued until the reaction was more than 95% complete. Volatile liquids were then removed under a pressure of less than 10 mm Hg and a temperature 100° C.

Adhesion Additive D1 was prepared using 32.9 g of the $(CH_3)_2HSiO_{1/2}/SiO_{4/2}$ copolymer, 7.43 g allylglycidyl ether, 9.67 g vinyltrimethoxysilane, and 29 microliters of the platinum catalyst solution.

Adhesion Additive D2 was prepared using 30.79 g of the same copolymer used to prepare D1, 6.96 g allylglycidyl ether, 12.25 g hexenyltrimethoxysilane, and 29 microliters of the platinum catalyst solution.

Adhesion Additive D3 was prepared using 29.41 g of the same copolymer used to prepare additive D1, 8.88 g limonene oxide, 11.71 g hexenyltrimethoxysilane, and 29 microliters of the platinum catalyst solution.

Adhesion Additive D4 was prepared for comparative purposes using 35.82 g of the same organohydrogensiloxane used as ingredient B, 6.16 g allylglycidyl ether, 8.02 g vinyltrimethoxysilane, and 29 microliters of the platinum catalyst solution.

Adhesion Additive D5 was prepared for comparative purposes by reacting 33.93 g of the organohydrogensiloxane used as ingredient B with 5.83 g allylglycidyl ether and 10.24 g hexenyltrimethoxysilane in the presence of 29 microliters of the platinum catalyst solution.

The molar quantities of epoxy- and alkenyl-substituted silanes added were each equivalent to 20% of the silicon-bonded hydrogen atoms in the initial copolymer with which the silanes are reacted.

Adhesion additive D6 was allyltrimethoxysilane and Adhesion additive D7 was ethyl orthosilicate. Both of these additives were used for comparative purposes.

EXAMPLE 1

Six curable compositions containing the present adhesion additives at two concentration levels and four comparative compositions were prepared by making a physical blend of the ingredients. The amounts of the various adhesion additives were equivalent to equimolar quantities of each additive.

The ingredient referred to as A was a dimethylvinylsiloxy-terminated polydimethylsiloxane with a viscosity of 2.2 Pa.s;

Ingredient B was a trimethylsiloxy-terminated organosiloxane copolymer containing an average of five methylhydrogensiloxane units and three dimethylsiloxane units per molecule with a silicon-bonded hydrogen atom content of about 0.8 weight percent.

Each of the compositions contained 0.253 part of a catalyst that was a reaction product of hexachloroplatinic acid and sym-tetramethyldivinyldisiloxane that had been diluted with a liquid dimethylvinylsiloxy terminated polydimethylsiloxane in an amount sufficient to achieve a platinum content of 0.6 weight percent; as a catalyst inhibitor, 0.083 part by weight of cyclic methylvinylsiloxanes; and 0.15 part of tetrabutyl titanate to facilitate reaction of the adhesion additive.

TABLE 1

| Composition | 1 | 2 | 3 | 4 | 5 | 6 |
|---|---|---|---|---|---|---|
| Ingredient A (Parts) | 146 | 144 | 146 | 144 | 146 | 144 |
| Ingredient B (Parts) | 2.4 | 1.6 | 2.4 | 1.6 | 2.4 | 1.6 |
| Additive | D1 | D1 | D2 | D2 | D3 | D3 |
| Parts of Additive | 2.1 | 4.1 | 2.2 | 4.4 | 2.3 | 4.6 |

TABLE 2

| Composition | C1 | C2 | C3 | C4 |
|---|---|---|---|---|
| Ingredient A (Parts) | 146 | 144 | 146 | 144 |
| Ingredient B (Parts) | 2.4 | 1.6 | 2.4 | 1.6 |
| Additive | D4 | D4 | D5 | D5 |
| Parts Additive | 1.9 | 3.8 | 2.0 | 4.0 |

Films of each composition measuring 0,008 in (0.2 mm) were applied to each of the substrates using a draw-down bar. The coatings were allowed to cure under ambient conditions or in a forced air oven at 70° C. for 30 minutes followed by additional curing at room temperature for the time periods specified in Tables 3 and 4. The cured coatings were then tested to determine adhesion.

The adhesion test consisted of scratching the cured coating with the blade of a metal spatula to determine whether the coating could be removed without leaving a residue on the surface (adhesive failure, AF) or whether failure occurred within the coating layer, resulting in at least a portion of the coating material in the test area adhering to the substrate (cohesive failure, CF). On some samples the coating exhibited adhesive failure in one area and cohesive in another area (AF/CF).

Coatings exhibiting cohesive failure were further tested to determine if the residue on the substrate and the adjacent coating material could be removed by rubbing with a finger. If the coating could be removed in this manner, the pressure required to remove the coating was rated on a subjective scale as slight (WE), medium (WM) or high (WD).

The substrates on which the curable compositions were evaluated were glass microscope slides (glass) or panels measuring 7.6 by 12.7 cm. and formed from type 3003 H14 alloy mill finish aluminum available from Q-Panel (aluminum).

The results of the adhesion tests are summarized in Table 3 for the samples cured under ambient conditions and Table 4 for the samples cured at 70° C.

TABLE 3

| Composition | Room Temperature Adhesion | | | | | |
| --- | --- | --- | --- | --- | --- | --- |
| | Glass | | | Aluminum | | |
| | 1 day | 3 day | 7 day | 1 day | 3 day | 7 day |
| 1 | CF | CF | CF | AF | AF/CF | CF/WD |
| 2 | CF | CF | CF | AF | AF/CF | CF/WD |
| 3 | CF | CF | CF | CF/WE | CF | CF |
| 4 | CF | CF | CF | CF/WD | CF | CF |
| 5 | CF | CF | CF | CF/WE | CF/WE | CF/WD |
| 6 | CF | CF | CF | CF/WE | CF/WD | CF/WD |
| C1 | CF | CF | CF | CF/WE | CF/WE | CF |
| C2 | CF | CF | CF | CF/WE | CF/WE | CF |
| C3 | CF | CF | CF | CF/WE | CF/WD | CF |
| C4 | CF | CF | CF | CF | CF | CF |

TABLE 4

| Composition | Oven Cured Adhesion | | | | | |
| --- | --- | --- | --- | --- | --- | --- |
| | Glass | | | Aluminum | | |
| | Initial | 1 day | 3 day | Initial | 1 day | 3 day |
| 1 | CF | CF | CF | CF/WE | CF/WD | CF |
| 2 | CF | CF | CF | CF/WE | CF/WD | CF |
| 3 | CF | CF | CF | CF | CF | CF |
| 4 | CF | CF | CF | CF | CF | CF |
| 5 | CF | CF | CF | CF/WD | CF/WD | CF |
| 6 | CF | CF | CF | CF/WD | CF | CF |
| C1 | CF | CF | CF | CF/WD | CF | CF |
| C2 | CF | CF | CF | CF/WD | CF/WD | CF |
| C3 | CF | CF | CF | CF | CF | CF |
| C4 | CF | CF | CF | CF | CF | CF |

All of the adhesion additives tested ultimately provided cohesive failure to both substrates under both curing conditions.

EXAMPLE 2

A number of preferred adhesion additives of this invention were evaluated using a 2-part curable organosiloxane composition.

Part 1 of the composition contained 52 parts of a dimethylvinylsiloxy-terminated polydimethylsiloxane having a viscosity of 0.4 Pa.s at 25° C., 46 parts of quartz with an average particle size of 5 microns, 0.9 part of zinc oxide, 0.5 part carbon black and 0.2 part of a reaction product of hexachloroplatinic acid and sym-tetramethyldivinyldisiloxane that has been diluted with a liquid dimethylvinylsiloxy terminated polydimethylsiloxane in an amount sufficient to achieve a platinum content of 0.7 weight percent.

Part 2 of the composition contained 46 parts of the same dimethylvinylsiloxy-terminated polydimethylsiloxane as part 1, 47 parts of the same quartz filler, 6 parts of a trimethylsiloxy-terminated polydiorganosiloxane having an average of five methylhydrogensiloxane units and three dimethylsiloxane units per molecule with a silicon-bonded hydrogen atom content of 0.8 weight percent and 0.5 part of cyclic methylvinylsiloxanes as a platinum catalyst inhibitor.

The curable compositions also contained one of the adhesion additives identified in the preceding section of this specification and all but one of the compositions (C5) contained 0.15 part of tetrabutyl titanate. The concentrations of parts 1 and 2 of a curable organosiloxane composition, defined in example 2, and the adhesion additives are; listed in Table 5.

TABLE 5

| Composition | C5 | C6 | 7 | 8 | 9 | C7 | C8 |
| --- | --- | --- | --- | --- | --- | --- | --- |
| Part 1 (Parts) | 7.50 | 7.50 | 9.53 | 9.53 | 9.53 | 9.53 | 9.53 |
| Part 2 (Parts) | 7.50 | 7.49 | 5.46 | 5.46 | 5.46 | 5.46 | 5.46 |
| Additive Type | None | None | D1 | D2 | D3 | D4 | D5 |
| Additive (Parts) | — | — | 0.41 | 0.44 | 0.46 | 0.38 | 0.40 |

Compositions C5, C6, C7, and C8 are for comparative purposes. The concentrations of adhesion additives provided equimolar amounts of the additive in each composition. The adhesion of the cured compositions was evaluated as described in Example 1 and the results are recorded in Tables 6 and 7.

TABLE 6

| | Room Temperature Adhesion | | | | | |
|---|---|---|---|---|---|---|
| | Glass | | | Aluminum | | |
| Composition | 1 day | 3 day | 7 day | 1 day | 3 day | 7 day |
| C5 | CF/WD | CF/WD | CF | AF | AF | AF |
| C6 | AF/CF | AF | AF | CF/WE | AF | AF |
| 7 | AF | AF | AF | AF | AF | AF |
| 8 | CF | CF/WD | CF | CF/WD | CF | CF |
| 9 | CF | CF/WD | CF | CF/WD | AF/CF | CF |
| C7 | CF/WD | CF/WD | CF | AF | AF | AF |
| C8 | CF | CF | CF | AF/CF | AF/CF | CF/WD |

TABLE 7

| | Oven Cured Adhesion | | | | | |
|---|---|---|---|---|---|---|
| | Glass | | | Aluminum | | |
| Composition | Initial | 1 day | 3 day | Initial | 1 day | 3 day |
| C5 | CF/WD | CF | CF | AF | AF | AF |
| C6 | AF | AF | AF | AF | AF | AF |
| 7 | AF | AF | AF | AF | AF | AF |
| 8 | CF/WD | CF | CF | AF | CF/WD | CF |
| 9 | CF/WD | CF | CF | AF | AF/CF | CF |
| C7 | AF | CF/WE | CF | AF | AF | CF/WE |
| C8 | AF | CF/WD | CF | AF | CF/WD | CF |

EXAMPLE 3

This example demonstrates the beneficial effect of using the present adhesion additives in combination with silanes containing at least three alkoxy groups per molecule.

Each of the curable compositions contained 9.53 parts of Part 1 of example 2, 5.48 parts of Part 2, and 0.015 part of tetrabutyl titanate. Additive D2 was the additive of the present invention and additive D5 in compositions C9, C10 and C11 was used for comparative purposes. The ingredients of the compositions are summarized in Table 8.

TABLE 8

| Composition | 10 | 11 | 12 | C9 | C10 | C11 |
|---|---|---|---|---|---|---|
| Additive | D2 | D2 | D2 | D5 | D5 | D5 |
| Pts. Additive | 0.44 | 0.44 | 0.44 | 0.40 | 0.40 | 0.40 |
| Silane | D6 | D7 | D6/D7 | D6 | D7 | D6/D7 |
| Parts Monomer | 0.38 | 0.38 | 0.19/0.19 | 0.38 | 0.30 | 0.19/0.19 |
| Ingredient B | 0.80 | — | 0.40 | 0.80 | — | 0.40 |

The concentrations of adhesion additives were selected to provide an equal molar amount of each. The adhesion of these compositions was tested as described in a preceding section of this specification and the results are recorded in Tables 9 and 10.

TABLE 9

| | Room Temperature Adhesion | | | | | |
|---|---|---|---|---|---|---|
| | Glass | | | Aluminum | | |
| Composition | 1 day | 3 day | 7 day | 1 day | 3 day | 7 day |
| 10 | CF/WD | CF/WD | CF/WD | CF/WD | CF/WD | CF/WD |
| 11 | CF | CF | CF | AF/CF | AF/CF | AF/CF |
| 12 | CF | CF/WD | CF | CF/WD | AF/CF | CF |
| C9 | CF/WD | CF/WD | CF | AF | AF | AF |
| C10 | AF/CF | AF | AF | CF/WE | AF | AF |
| C11 | AF | AF | AF | AF | AF | AF |

TABLE 10

| | Oven Cured Adhesion | | | | | |
| | Glass | | | Aluminum | | |
| Composition | Initial | 1 day | 3 day | Initial | 1 day | 3 day |
| --- | --- | --- | --- | --- | --- | --- |
| 10 | CF/WD | CF/WD | CF | CF/WE | CF | CF |
| 11 | AF | CF/WD | CF | AF | CF/WD | CF |
| 12 | CF/WD | CF | CF | AF | AF/CF | CF |
| C9 | CF/WD | CF | CF | AF | AF | AF |
| C10 | AF | AF | AF | AF | AF | AF |
| C11 | AF | AF | AF | AF | AF | AF |

That which is claimed is:

1. An organosiloxane copolymer corresponding to the general formula $$\{XR^1{}_2SiO_{1/2}\}_a\{SiO_2\}_b\{(R^2O)_3SiR^3(R^1)_2SiO_{1/2}\}_c\{R^4{}_xR^5{}_ySiO_{(4-x-y)/2}\}_d\{R^1{}_v(R^2O)_wSiO_{(4-v-w)/2}\}_e\{R^2O_{1/2}\}_f\{HO_{1/2}\}_g$$

wherein each $R^1$ is individually selected from monovalent hydrocarbon or halogenated hydrocarbon radicals that are substantially free of ethylenic unsaturation and contain from 1 to 10 carbon atoms;

each $R^2$ is individually selected from alkyl radicals containing 1 to 10 carbon atoms;

$R^3$ is a divalent hydrocarbon radical containing from 2 to 10 carbon atoms;

each $R^4$ is individually selected from monovalent hydrocarbon radicals containing an epoxy, acryloxyalkyl or methacryloxyalkyl group;

$R^5$ is $R^1$ or $OR^2$;

X is hydrogen or an alkenyl radical;

a, b, c, d, e, f and g represent mole fractions with a total value of 1;

a, b, c, and d are all greater than zero;

e, f and g are 0 or a positive number less than 1;

x is 1, 2, or 3;

y is 0, 1, or 2;

x+y is 1, 2 or 3;

v and w are each 0, 1, 2, or 3;

and v+w is 1, 2 or 3.

2. A copolymer according to claim 1 wherein each $R^1$ is individually selected from methyl, phenyl, and 3,3,3-trifluoropropyl;

each $OR^2$ and $R^5$ is individually selected from methoxy and ethoxy;

$R^3$ is selected from the group consisting of ethylene, propylene, cyclohexylene and phenylene;

$R^4$ is selected from the group consisting of 3-glycidoxypropyl, 3-epoxycyclohexylmethyl and 3-methacryloxypropyl; the alkenyl radicals represented by X contain from 2 to 12 carbon atoms;

x is 1; y is 2;

the $XR^1{}_2SiO_{1/2}$ units constitute from 5 to 50 percent of the total units in said copolymer;

the $(R^2O)_3SiR^3(R^1)_2SiO_{1/2}$ units constitute from 3 to 30 percent of the total units in said copolymer;

the $R^4{}_xR^5{}_ySiO_{(4-x-y)/2}$ units constitute from 3 to 30 percent of the total units in said copolymer; and the $SiO_{4/2}$ units constitute from 10 to 50 percent, of the total units in said copolymer.

3. A copolymer according to claim 2 wherein the $XR^1{}_2SiO_{1/2}$ units are selected from the group consisting of dimethylhydrogensiloxy and dimethylvinylsiloxy and constitute from 25 to 40 percent of the units in said copolymer; the $(R^2O)_3SiR^3(R^1)_2SiO_{1/2}$ units are trimethoxysilylethyldimethylsiloxy; and the $R^4{}_xR^5{}_ySiO_{(4-x-y)/2}$ units are 3-glycidoxypropyldimethylsiloxy.

4. In a curable organosiloxane composition comprising (A) a curable polyorganosiloxane;

(B) a curing agent in an amount sufficient to cure said composition; and (C) a curing catalyst in an amount sufficient to promote curing of said composition;

wherein the combination of curable polyorganosiloxane, curing agent and curing catalyst is selected from the group consisting of 1) polyorganosiloxanes containing at least two alkenyl radicals per molecule as the reactive group; as the curing agent, organohydrogensiloxanes containing an average of at least more than two silicon-bonded hydrogen atoms per molecule as the reactive groups; and a curing catalyst selected from metals from the platinum group of the periodic table or compounds thereof; and 2) polyorganosiloxanes containing silanol groups as the reactive group; as the curing agent, organohydrogensiloxanes containing at least three silicon-bonded hydrogen atoms per molecule as the reactive group; and a curing catalyst selected from metals from the platinum group of the periodic table or compounds thereof;

the improvement comprising the presence in said composition of (D) an adhesion promoting additive in an amount sufficient to achieve adhesion to a substrate in contact with said composition during curing thereof, wherein said additive comprises at least one organosiloxane copolymer corresponding to the general formula $$\{XR^{12}SiO_{1/2}\}_a\{SiO_2\}_b\{(R^2O)_3SiR^3(R^1)_2SiO_{1/2}\}_c -$$

$$\{R^4{}_xR^5{}_ySiO_{(4-x-y)/2}\}_d\{R^1{}_v(R^2O)_wSiO_{(4-v-w)/2}\}_e\{R^2O_{1/2}\}_f\{HO_{1/2}\}_g$$

wherein each $R^1$ is individually selected from monovalent hydrocarbon or halogenated hydrocarbon radicals that are substantially free of ethylenic unsaturation and contain from 1 to 10 carbon atoms;

each $R^2$ is individually selected from alkyl radicals containing 1 to 10 carbon atoms;

$R^3$ is a divalent hydrocarbon radical containing from 2 to 10 carbon atoms;

each $R^4$ is individually selected from monovalent hydrocarbon radicals containing an epoxy, acryloxyalkyl or methacryloxyalkyl group;

$R^5$ is $R^1$ or $OR^2$;

X is hydrogen or an alkenyl radical;

a, b, c, d, e, f and g represent mole fractions with a total value of 1;

a, b, c, and d are all greater than zero;

e, f and g are 0 or a positive number less than 1;

x is 1, 2, or 3;

y is 0, 1, or 2;

x+y is 1, 2 or 3;

v and w are each 0, 1, 2, or 3;

and v+w is 1, 2 or 3.

5. A composition according to claim 4 wherein said composition is cured by a hydrosilation.

6. A composition according to claim 5 wherein each $R^1$ is individually selected from methyl, phenyl, or 3,3,3-trifluoropropyl;

$OR^2$ and $R^5$ are individually selected from methoxy or ethoxy; $R^3$ is selected from the group consisting of ethylene, propylene, cyclohexylene or phenylene;

$R^4$ is selected from the group consisting of 3-glycidoxypropyl, 3-epoxycyclohexylmethyl and 3-methacryloxypropyl; the alkenyl radicals represented by X contain from 2 to 12 carbon atoms;

x is 1; y is 2; the $XR^1_2SiO_{1/2}$ units constitute from 5 to 50 percent of the total units in said copolymer;

the $(R^2O)_3SiR^3(R^1_2)SiO_{1/2}$ units constitute from 3 to 30 percent of the total units in said copolymer;

the $R^4_xR^5_ySiO_{(4-x-y)/2}$ units constitute from 3 to 30 percent of the total units in said copolymer; and the $SiO_{4/2}$ units constitute from 10 to 50 percent, of the total units in said copolymer.

7. A composition according to claim 6 wherein the $XR^1_2SiO_{1/2}$ units are selected from the group consisting of dimethylhydrogensiloxy and dimethylvinylsiloxy;

the $(R^2O)_3SiR^3(R^1)_2SiO_{1/2}$ units are trimethoxysilylethyldimethylsiloxy;

the $R^4_xR^5_ySiO_{(4-x-y)/2}$ units are 3-glycidoxypropyldimethylsiloxy;

from 25 to 40 percent of the units of said copolymer contain a silicon-bonded hydrogen atom.

8. A composition according to claim 7 wherein said composition further comprises an organotitanium compound as a catalyst to promote hydrolysis of said adhesion promoting additive.

9. A composition according to claim 7 wherein said adhesion promoting additive further comprises from i to 5 weight percent, based on the weight of said composition, of a silane containing at least three alkoxy groups.

10. A composition according to claim 9 wherein said silane is selected from the group consisting of alkenyltrialkoxysilanes and alkyl orthosilicates.

11. A composition according to claim 4 wherein said polyorganosiloxane contains at least two alkenyl radicals per molecule as the reactive group, said curing agent comprises at least one organohydrogensiloxane containing an average of more than two silicon-bonded hydrogen atoms per molecule as the reactive group, and said curing catalyst is selected from metals from the platinum group of the periodic table or compounds thereof, and the curing temperature of said composition is up to 100° C.

12. A composition according to claim 11 wherein said composition is packaged in at least two containers, said organohydrogensiloxane and said curing catalyst being located in separate containers.

13. A composition according to claim 11 wherein said polyorganosiloxane is a polydiorganosiloxane exhibiting a viscosity greater than 0.1 Pa.s at 25° C.;

the viscosity of said organohydrogensiloxane at 25° C. is from 0.003 to 10 Pa.s;

the organic groups bonded to the silicon atoms of said polydiorganosiloxane and said organohydrogensiloxane in addition to said reactive groups are monovalent unsubstituted or substituted hydrocarbon radicals;

the concentration of said organohydrogensiloxane provides a molar ratio of silicon-bonded hydrogen atoms to alkenyl radicals in said composition of from 0.5 to 2; and the concentration of said curing catalyst is equivalent to from 1 to 50 parts by weight of platinum group metal per million parts by weight of the combination of said polyorganosiloxane and said organohydrogensiloxane.

14. A composition according to claim 13 wherein said polydiorganosiloxane is represented by the general formula $$R^8-[SiO]_n-Si-R^8$$

with $R^7$ substituents on each Si wherein each $R^7$ is individually selected from monovalent hydrocarbon radicals, $R^8$ represents a vinyl or other alkenyl radical, and n represents a degree of polymerization equivalent to a viscosity of at least 100 centipoise (0.1 Pa.s).

* * * * *